US011797368B2

United States Patent
Nagaraj et al.

(10) Patent No.: US 11,797,368 B2
(45) Date of Patent: Oct. 24, 2023

(54) ATTRIBUTING ERRORS TO INPUT/OUTPUT PERIPHERAL DRIVERS

(71) Applicant: HEWLETT PACKARD ENTERPRISE DEVELOPMENT LP, Houston, TX (US)

(72) Inventors: Venkatesh Nagaraj, Karnataka (IN); Mekhla Garg, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 3 days.

(21) Appl. No.: 17/585,786

(22) Filed: Jan. 27, 2022

(65) Prior Publication Data
US 2023/0236917 A1    Jul. 27, 2023

(51) Int. Cl.
*G06F 11/07* (2006.01)
*G06F 9/50* (2006.01)
*G06F 11/30* (2006.01)
*G06F 11/14* (2006.01)

(52) U.S. Cl.
CPC ........ *G06F 11/0772* (2013.01); *G06F 9/5016* (2013.01); *G06F 11/0793* (2013.01); *G06F 11/142* (2013.01); *G06F 11/3041* (2013.01)

(58) Field of Classification Search
CPC ............... G06F 11/0772; G06F 9/5016; G06F 11/0793; G06F 11/142; G06F 11/3041
USPC ........................................................ 714/48
See application file for complete search history.

(56) References Cited

U.S. PATENT DOCUMENTS

| | | | |
|---|---|---|---|
| 8,782,461 B2 | 7/2014 | Muthrasanallur et al. | |
| 9,342,394 B2 | 5/2016 | Nachimuthu et al. | |
| 9,806,904 B2 | 3/2017 | Watkins et al. | |
| 9,798,641 B2 | 6/2017 | Swanson et al. | |
| 10,078,543 B2 | 9/2018 | Watkins et al. | |
| 10,514,972 B2 | 10/2019 | Chaiken et al. | |
| 2008/0082665 A1 | 4/2008 | Dague et al. | |
| 2019/0394081 A1 | 12/2019 | Tahhan et al. | |
| 2020/0174875 A1* | 6/2020 | Rudy | G06F 11/0751 |
| 2020/0319987 A1 | 10/2020 | Yang et al. | |
| 2020/0326925 A1 | 10/2020 | Nachimuthu et al. | |

\* cited by examiner

*Primary Examiner* — Yair Leibovich
(74) *Attorney, Agent, or Firm* — Hewlett Packard Enterprise

(57) ABSTRACT

A process includes determining, by an operating system agent of a computer system, a first profile that is associated with an input/output (I/O) peripheral of the computer system. The first profile is associated with an error register of the I/O peripheral, and the first profile represents a configuration of the computer system that is associated with the I/O peripheral. The process includes, responsive to a notification of an error being associated with the I/O peripheral, determining, by the operating system agent, a second profile that is associated with the I/O peripheral. The second profile is associated with the error register. Moreover, responsive to the notification of the error, the process includes comparing, by a baseboard management controller of the computer system, the second profile to the first profile. Based on the comparison, the process includes determining, by the baseboard management controller, whether the error is attributable to a driver for the I/O peripheral.

19 Claims, 8 Drawing Sheets

ATTRIBUTING ERRORS TO INPUT/OUTPUT PERIPHERAL DRIVERS

BACKGROUND

A computer platform may have reliability, availability and serviceability (RAS) capabilities for purposes of detecting, or identifying, faults, or errors, occurring in the computer platform, rectifying the errors and reporting the errors. The errors may originate from a number of different components and subsystems of the computer platform, such as a central processing unit (CPU) subsystem, a memory subsystem, an input/output (I/O) subsystem, a chipset or other hardware. As an example, hardware of the computer platform may detect an error associated with an I/O peripheral and generate another error notification, such as a system management interrupt (SMI). An SMI handler of the computer platform's firmware may take action to correct the error (if the error is correctable), generate a corresponding error log record (e.g., a common platform error record (CPER)) and generate another error notification, such as a non-maskable interrupt (NMI). An operating system I/O driver for the I/O peripheral may, responsive to the NMI, may take one or multiple further actions to respond to the error. For example, the I/O driver may quiesce I/O data with the I/O peripheral and reinitialize an I/O stack to avoid corruption of data.

DETAILED DESCRIPTION

Figure 1:
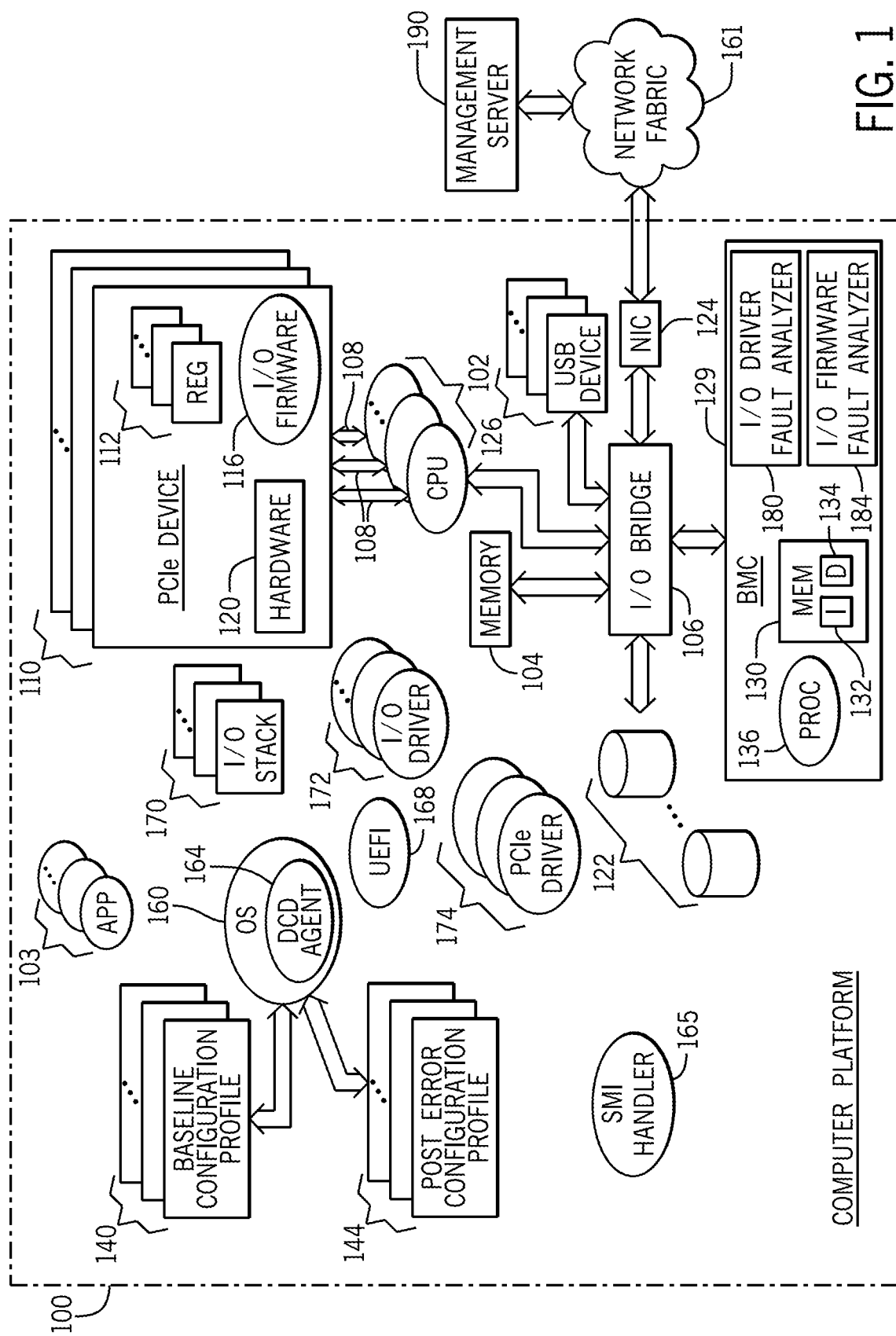
FIG. 1 is a schematic diagram of a computer platform having a baseboard management controller (BMC)-based input/output (I/O) driver fault analyzer and a BMC-based I/O firmware fault analyzer according to an example implementation.

A computer platform may have a number of I/O peripherals (e.g., Peripheral Component Interconnect express (PCIe)-cased based peripherals) that may be provided by one or multiple vendors. The vendors may provide I/O drivers and I/O firmware for the I/O peripherals. Although the manufacturer of the computer platform may impose certain quality standards for its software and firmware components, these quality standards may not be met by the I/O drivers and I/O firmware. Moreover, the quality standard gap may be further exacerbated when the I/O firmware is open-source firmware, especially when the computer platform has relatively high quality standards, such as the quality standards imposed by a mission critical platform. Quality-related problems arising with an I/O driver or I/O firmware may cause a number of faults, or errors, in the computer platform, such as errors arising due to improper handling of error recovery, completion timeouts, bandwidth degradation, firmware update issues, incompatible I/O drivers, and so forth.

Although the computer platform may have RAS capabilities for purposes of detecting and reporting errors, these RAS capabilities may insufficient for purposes of determining or identifying the exact causes of errors. More specifically, the computer platform may classify errors based on hardware affiliated with the errors. Based on the classifications, firmware and/or the operating system of the computer platform may take corresponding corrective actions. Moreover, the computer platform may report the errors to a system administrator as being correctable or uncorrectable errors. However, the computer platform may not identify the exact causes of the errors. For example, for an error that is associated with an I/O peripheral, the computer platform may not provide information that identifies whether the error is attributable to a faulty, I/O driver for the I/O peripheral, attributable to faulty I/O firmware of the I/O peripheral, or attributable to another hardware or software component.

In accordance with example implementations that are disclosed herein, a computer platform captures an initial baseline configuration of the platform for an I/O peripheral. Responsive to an error notification being generated for the I/O peripheral, the computer platform captures a post error configuration profile of the platform for the I/O peripheral. The computer platform, in accordance with example implementations, performs a comparative analysis of the two configuration profiles for purposes of determining whether an I/O driver for the I/O peripheral is at fault for the error. In this way, the computer platform may readily identify a faulty I/O driver so that the I/O driver may be replaced or updated.

More specifically, in accordance with example implementations, an operating system of the computer platform includes a background process, or daemon, agent (called an "operating system data collection daemon agent" or "data collection daemon agent" herein) that discovers I/O peripherals at the power on or reset of the computer system and captures, or determines, baseline configuration profiles for the discovered I/O peripherals. In general, the baseline configuration profile represents a snapshot of a configuration state of the computer platform for a corresponding I/O peripheral at the time of the power on or reset of the computer platform. The post error configuration profile, in accordance with example implementations, represents a snapshot of the configuration state of the computer platform for the corresponding I/O peripheral at a time after the error occurs.

As an example, the configuration state captured by the baseline configuration profile or the post error configuration profile may include an amount of memory-mapped I/O (MMIO) space set up for the I/O peripheral; an amount of I/O space set up for the I/O peripheral; a number of base address registers (BARs) set up for the I/O peripheral; and so forth. The configuration state is controlled by the I/O driver, and as such, by comparing the configuration state at different times (as represented by the different snapshots), the computer platform may determine whether the I/O driver is performing as intended, i.e., whether the I/O driver is "buggy," or faulty. In accordance with some implementations, a management controller of the computer platform, such as a baseboard management controller (BMC), may perform the comparative analysis of the baseline and post error configuration profiles for purposes of determining whether the error may be attributed to a driver for the I/O peripheral.

In accordance with example implementations, in addition to determining whether a particular error is attributable to an I/O driver, the computer platform may further determine whether the error is attributed to firmware (called "I/O firmware" herein) of the I/O peripheral. As described herein, in accordance with example implementations, the computer platform may base this determination on one or multiple criteria, such as a version of the I/O firmware (e.g., whether the version is one that is known to be reliable); whether the I/O firmware is proprietary or open source firmware; a health state of the I/O firmware; and whether or not the I/O firmware is secured. Moreover, in accordance with example implementations, the determination of whether an I/O error is attributable to I/O firmware may be made by a management controller of the computer platform, such as a BMC.

Referring to FIG. 1, as a more specific example, in accordance with some implementations, a computer platform 100 includes one or multiple I/O peripherals, such as Peripheral Component Interconnect express (PCIe) devices 110. As used herein, a "computer platform" is a computer system that corresponds to a unit of hardware and software, which is associated with at least one operating system instance. The computer platform 100 may take on any of a number of different forms. For example, in accordance with some implementations, the computer platform 100 may be a server, such as a blade server or a rack-mounted server. The computer platform 100 may be, however, a computer system other than a server, in accordance with further implementations, such as a storage array, a modular switch, a portable computer, a smartphone, an edge processing system, a client, a tablet computer, a desktop and so forth.

Regardless of its particular form, the computer platform 100 includes hardware that is capable of processing machine-executable instructions, and a frame, or chassis, to which the hardware is mounted. For example, in accordance with some implementations, the computer platform 100 may include one or multiple motherboards that may be mounted to a chassis, and each motherboard may contain one or multiple multicore central processing unit (CPU) semiconductor packages (or "sockets" or "chips"). As a more specific example, in accordance with some implementations, the computer platform 100 may be a blade server; and the blade server may have a form factor, one or multiple mechanical latches, and corresponding electrical connectors for purposes of allowing the blade server to be installed in and removed from a corresponding server blade opening, or slot, in a rack-mounted blade enclosure.

In accordance with some implementations, the computer platform 100 may be a "mission critical" platform, in that the computer platform 100 may form part or all of a mission critical computer system (e.g., a computer system that has been deemed important to a business enterprise such that the enterprise may incur significant disruption and/or significant financial loss if the computer system fails). In accordance with some implementations, the computer platform 100 may provide one or multiple nodes of a cluster. In accordance with further implementations, the computer platform 100 may not be part of a cluster. Moreover, in accordance with further implementations, the computer platform 100 may not be a mission critical platform, and the computer platform 100 may not be associated with a mission critical computer system.

As used herein, a "peripheral" refers to a component of the computer platform 100, which provides one or multiple functions for a host of the computer platform 100. A "host" refers to a set of components of the computer platform 100, which provide one or multiple operating system instances for the computer platform. For the example implementation that is depicted in FIG. 1, the host may include such components as one or multiple CPUs 102, a system memory 104 and a bridge infrastructure. One or multiple CPUs 102 may execute machine-executable instructions (e.g., instructions stored in the system memory 104) to form one or multiple instances of an operating system 160 and form one or multiple instances of applications 103, which cause requests to be submitted to peripherals of the computer platform 100. As used herein, an "I/O peripheral" refers to a peripheral that provides at least one of an input to the host or receives an output from the host. As examples, I/O peripherals may be network interface controllers (NICs), host bus adapters, storage cards, smart NIC(s), smart I/O devices, and so forth. Although PCIe devices 110 are discussed herein as examples of I/O peripherals, in accordance with further implementations, the computer platform 100 may include one or multiple I/O peripheral devices other than or in addition to the PCIe device(s) 110 (i.e., I/O peripheral devices that are associated with buses or links other than PCIe interfaces).

An I/O peripheral may have an I/O driver, which corresponds to machine-executable instructions that are executed by the host as part of an operating system 160 instance. For example implementations that are described herein, one or multiple CPUs 102 execute machine-executable instructions (e.g., instructions stored in the system memory 104) corresponding to I/O drivers 172. In accordance with example implementations, each I/O driver 172 corresponds to a particular I/O peripheral (e.g., a particular PCIe device 110) and may be provided by the vendor that provides the I/O peripheral (e.g., the PCIe device 110). In this context, an "I/O driver" refers to a software component, which manages a corresponding I/O peripheral for the host. In accordance with example implementations, the I/O driver may be installed as part of the operating system 160. The management of the I/O peripheral may include translating higher level commands (e.g., read and write commands) to lower level commands (e.g., commands directed to specific registers of the I/O peripheral). Moreover, the management of the I/O peripheral may include configuring the I/O peripheral, configuring the host (i.e., configuring the computer platform 100) for the I/O peripheral, performing one or multiple recovery actions responsive to an error being associated with the I/O peripheral, and so forth.

The host may communicate with a given I/O peripheral using a hierarchical chain of multiple drivers. The drivers may correspond to layers of an I/O stack 170. For example, to communicate with a PCIe device 110, the host may execute machine-executable instructions corresponding to a PCIe driver 174 (corresponding to an upper layer of the I/O stack 170) and execute machine-executable instructions corresponding to an I/O driver 172 (corresponding to a lower layer of the I/O stack 170). FIG. 1 depicts example I/O stacks 170 that are associated with corresponding I/O peripherals, such as corresponding PCIe devices 110. As an example, a given I/O stack 170 may have one layer associated with a PCIe driver 174 and another layer associated with an I/O driver 172. Moreover, in accordance with example implementations, a given I/O stack 170 may have more than two layers. In accordance with example implementations, the kernel of the operating system 160 may create a request structure for each request for an I/O peripheral (e.g., a PCIe device 110), and the request structure may have locations associated with different layers of the I/O stack 170.

The operating system 160, in accordance with example implementations, includes a data collection daemon agent 164 that, on platform start-up (i.e., responsive to a power on or a reset of the computer platform 100), discovers all of the I/O peripherals of the computer platform 100, such as the PCIe devices 110. For each discovered I/O peripheral, the data collection daemon agent 164 determines a corresponding baseline configuration profile 140 for the I/O peripheral. In this context, a "baseline configuration profile" refers to an initial configuration of the computer platform 100 for the corresponding I/O peripheral. In accordance with example implementations, the baseline configuration profile 140 is a captured initial snapshot of a state of the computer platform 100, where the state corresponds to a particular configuration of the computer platform 100 for a corresponding I/O peripheral.

Responsive to a notification of an error associated with an I/O peripheral, the data collection daemon agent 164 determines a post error configuration profile 144 for the I/O peripheral. In this context, a "post error configuration profile" refers to a configuration of the computer platform 100 for the corresponding I/O peripheral after an error event occurs. In accordance with example implementations, the post error configuration profile 144 is a captured snapshot of a state of the computer platform 100 corresponding to a time near or shortly thereafter an error associated with an I/O peripheral occurs, where the state corresponds to a particular configuration of the computer platform 100 for the I/O peripheral. The error notification may be generated in one of many different forms, such as a software interrupt, a hardware interrupt, a nonmaskable interrupt (NMI), a message, and so forth. An error being "associated with" an I/O peripheral refers to an error being attributed to the I/O peripheral. It is noted that a particular hardware or software component that is associated with an error may or may not be the specific cause of the error. In this manner, the error may be potentially due to a number of different causes, such as hardware of the I/O peripheral, I/O firmware of the I/O peripheral or an I/O driver executed by the host. The techniques, systems and components that are described herein perform a finer granularity analysis to specifically determine whether a driver or I/O firmware for an I/O peripheral is the cause of an error associated with the I/O peripheral.

For the foregoing discussion, it is assumed that the I/O peripheral is a PCIe device 110, although the I/O peripheral may be a component other than a PCIe device 110, in accordance with further implementations.

In accordance with example implementations, the PCIe device 110 includes one or multiple registers 112. As examples, the registers 112 may include PCIe configuration registers, such as base address registers (BARs). The registers 112 may include error registers, such as a correctable error status register, an uncorrectable error status register and Advanced Error Reporting (AER) registers. The correctable error status register represents the status(es) of corresponding detected correctable error(s). A correctable error is an error that does not impact the integrity of the PCIe interface, and as its name implies, may be corrected (e.g., data may be recovered). It is noted that correctable errors may impact a performance (e.g., increase a latency) of the PCIe device 110. A bad transaction layer packet (TLP) error and a replay timeout error are examples of correctable PCIe errors.

The uncorrectable error status register represents the status(es) of corresponding detected uncorrectable error(s). An uncorrectable error refers to data being lost. An uncorrectable error may be non-fatal or fatal. An uncorrectable error may be non-fatal, in that the error does not impact the integrity of the PCIe interface, although data is lost. An endpoint cyclic redundancy check (ECRC) error is an example of a non-fatal uncorrectable error, in that the corresponding packet is dropped, but no problem with the integrity of the PCIe interface is detected.

A fatal uncorrectable error refers to data being lost and a problem with the PCIe interface integrity being detected. A link training error and a malformed TLP error are examples of fatal, uncorrectable errors.

In general, AER registers contain data representing more specific details about errors associated with the PCIe device 110. The detail may include information about error severity and error sources (although not as specific as, for example, identifying an I/O driver 172 or I/O firmware 116 being the specific cause of the error). Moreover, as described further herein, the AER registers may contain data representing a configuration of the computer platform 100 for the PCIe device 110, such as the number of BARs configured, the amount of MMIO space set up for the PCIe device 110, and so forth.

As an example, the reading of the registers 112 for a given PCIe device 110 may reveal the following configuration:

Region 0: Memory at fc47d800000 (64-bit, prefetchable) [size=8 MB]

Region 2: Memory at fc47d000000 (64-bit, prefetchable) [size=8 MB]

Region 4: Memory at fc47f060000 (64-bit, prefetchable) [size=64 KB]

In addition to the registers 112, the PCIe device 110 may further include hardware 120 and I/O firmware 116. For example, the hardware 120 may include a memory that stores machine-executable instructions corresponding to the I/O firmware 116, and one or multiple processing cores that execute the I/O firmware 116 to perform one or multiple functions for the PCIe device 110. As further discussed herein, the I/O firmware 116 may be proprietary or open source firmware. In this context, an "open source" software component, such as a particular I/O firmware image correspond to the firmware 116, refers to a unit of machine-executable instructions, in which an exclusive owner or an exclusive set of owners do not control the rights to copy, inspect and/or alter the unit of software. As such, an open source software component may be used, distributed and modified by software developers that are individuals affiliated with different business enterprises, and so forth. Moreover, an open source software component may be incorporated into software products that are distributed and/or sold by such entities. A "proprietary" software component refers to a unit of machine-executable instructions, other than an "open source" software component.

In accordance with some implementations, the baseline configuration profile 140 for a given PCIe device 110 is considered to be "healthy" snapshot of a configuration state for the computer platform 100. As such, in accordance with some implementations, a deviation from the baseline configuration profile 140 is deemed to be an unhealthy, or undesired, configuration state. Because the corresponding I/O driver 172 controls the configuration state, in accordance with example implementations, the computer platform 100, in response to detecting a deviation from the baseline configuration profile 140 after an error event associated with the PCIe device 110, considers the error to be attributable to the corresponding I/O driver 172.

To generate a baseline configuration profile 140 for a given PCIe device 110, in accordance with example implementations, the data collection daemon agent 164 collects data from the PCIe device 110 representing states of registers 112 of the PCIe device 110. The data collection daemon agent 164 may further collect data representing a state of the corresponding I/O stack 170. Based on the type of PCIe device 110, the data collection daemon agent 164 collects data representing a health of the respective 10 stack 170. For example, if the PCIe device 110 is a NIC, then the I/O stack 170 may be a Transmission Control Protocol/Internet Protocol (TCP/IP) stack, and the data collection daemon agent 164 may collect such information as the number of packet drops, the number of cyclic redundancy check (CRC) drops, a number of link failures, a number of loss of synchronizations, an invalid transmit word count, and so forth. The data collection daemon agent 164 may add the collected data to the baseline configuration profile 140. The data collection daemon agent 164 may further add data to the baseline configuration profile 140, which tags the collected data with data identifying a version of the corresponding I/O firmware 116 and a version of the corresponding I/O driver 172. Moreover, in accordance with some implementations, the data collection daemon agent 164 may add data to the baseline configuration profile 140, which represents an up time for the I/O driver 172 (i.e., a time between the loading and unloading of the I/O driver 172).

For purposes of forming a post error configuration profile 144 for a PCIe device 110, the data collection daemon agent 164 may, similar to the generation of the baseline configuration profile 140, collect data from the same registers 112 of the PCIe device 110, tag the collected data with I/O firmware and I/O driver version and add driver up time data.

In accordance with example implementations, a management controller of the computer platform includes an I/O driver fault analyzer 180 that performs a comparative analysis of the post error configuration profile 144 with the baseline configuration profile 140 for purposes of determining whether an error may be attributed to an I/O driver 172. As depicted in FIG. 1, in accordance with example implementations, the management controller may be a baseboard management controller (BMC) 129. In accordance with further implementations, the management controller may be an entity other than a BMC, such as a system controller, a chassis management controller, and so forth.

After generating a baseline configuration profile 140, the data collection daemon agent 164 may communicate data representing the baseline configuration profile 140 to the BMC 129. For example, the data collection daemon agent 164 may push data representing the baseline configuration profile 140 to the BMC 129 through an Intelligent Platform Management Interface (IPMI) channel or a Redfish channel. The data collection daemon agent 164 may, responsive to an error event (i.e., an error notification) being detected and being associated with a particular PCIe device 110, push data representing a corresponding post error configuration profile 144 to the BMC 129 through an IPMI channel or Redfish channel.

As further described herein, in accordance with example implementations, the management controller, such as the BMC 129, may also include an I/O firmware fault analyzer 184 for purposes of determining whether an error may be attributed to I/O firmware 116 of a particular PCIe device 110. The I/O firmware fault analyzer 184 may, as further described herein, make this determination based on a number of factors, such as whether the I/O driver fault analyzer 180 did not attribute the error to the I/O driver 172; a version of the I/O firmware 116; whether the I/O firmware 116 is open source or proprietary firmware; and whether the I/O firmware is secured firmware.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with example implementations, the CPUs 102 may execute machine executable instructions to form one or multiple instances of one or multiple software or firmware components of the computer platform 100. As examples, these components may include the operating system 160; the data collection daemon agent 164; one or multiple applications 103; one or multiple I/O drivers 172; one or multiple PCIe drivers 174; platform firmware boot and runtime services, such as the services that are provided by a Unified Extensible Firmware Interface (UEFI) 168; one or multiple system management interrupt (SMI) handlers 165; and so forth. In accordance with example implementations, the SMI handler 165 may be part of the UEFI 168.

Among the other features of the computer platform 100, in accordance with example implementations, a bridge infrastructure of the computer platform 100 may include one or multiple input/output (I/O) bridges 106. The I/O bridge(s) 106 establish communications between various links, or buses, of the computer platform 100. The I/O bridge(s) 106 may be coupled to the CPUs 102 and the BMC 129, as well as various other hardware components of the computer platform 100, such as storage drives 122; the NIC 124; one or multiple Universal Serial Bus (USB) devices 126; a video controller; and so forth. Moreover, as also depicted in FIG. 1, in accordance with example implementations, the CPUs 102 may be coupled to the PCIe devices 110 through corresponding individual PCIe buses, or links 108. In accordance with a further example implementation, the PCIe device(s) 110 may be coupled to the I/O bridge(s) 106, instead of being coupled to the CPUs 102. In accordance with yet further implementations, the I/O bridge(s) 106 and PCIe interfaces may be part of one or multiple CPUs 102.

In general, the memory devices that form the system memory 104 as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with example implementations, the NIC 124 may provide connectivity for the computer platform 100 to network fabric 161. In accordance with some implementations, one or multiple PCIe devices 110 may provide network connectivity for the computer platform 100 to the network fabric 151.

In general, the network fabric 161 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

The BMC 129 may include a management plane and a security plane, which is isolated from the management plane. More specifically, in accordance with example implementations, the BMC 129 includes one or multiple main processing cores 136 that execute machine-executable instructions 132 (stored in a memory 130 of the BMC 129) to perform management functions for the computer platform 100. The instructions 132 may correspond to a firmware management stack of the BMC 129. As examples, by the main processing cores 136 executing the firmware management stack, the BMC 129 may perform a variety of management roles for the computer platform 100, such as monitoring sensors; monitoring operating system status; monitoring power statuses; logging computer system events; providing a remote console; providing remotely-controlled functions and other virtual presence technologies; and so forth. In accordance with example implementations, the main processing cores 136 may execute the instructions 132 for purposes of forming fault analysis components of the BMC 129, such as the I/O driver fault analyzer 180 and the I/O firmware fault analyzer 184. As depicted in FIG. 1, in accordance with example implementations, the BMC 129 may store data 134 in the memory 130. The data 134 may, for example, represent parameters used by the I/O driver fault analyzer 180 and the I/O firmware fault analyzer 181; baseline configuration profiles 140; post error configuration profiles 144; results provided by the I/O driver fault analyzer 180 and the I/O firmware fault analyzer 184; and so forth.

The BMC 129 may communicate with a remote management server 190 via the network fabric 161 for a number of different purposes. As examples, the BMC 129 may communicate with the remote management server 190 for such purposes as sending error reports to the server 190; setting up boot options for the computer platform 100; providing remote console control of the computer platform 100; updating platform firmware image; selecting virtual media; remotely powering up the computer platform 100; remotely powering down the computer platform 100; reporting sensor information from the computer platform 100; and so forth. In accordance with some implementations, the BMC 129 may include a NIC, which the BMC 129 uses to communicate with the remote management server 190.

Figure 2:
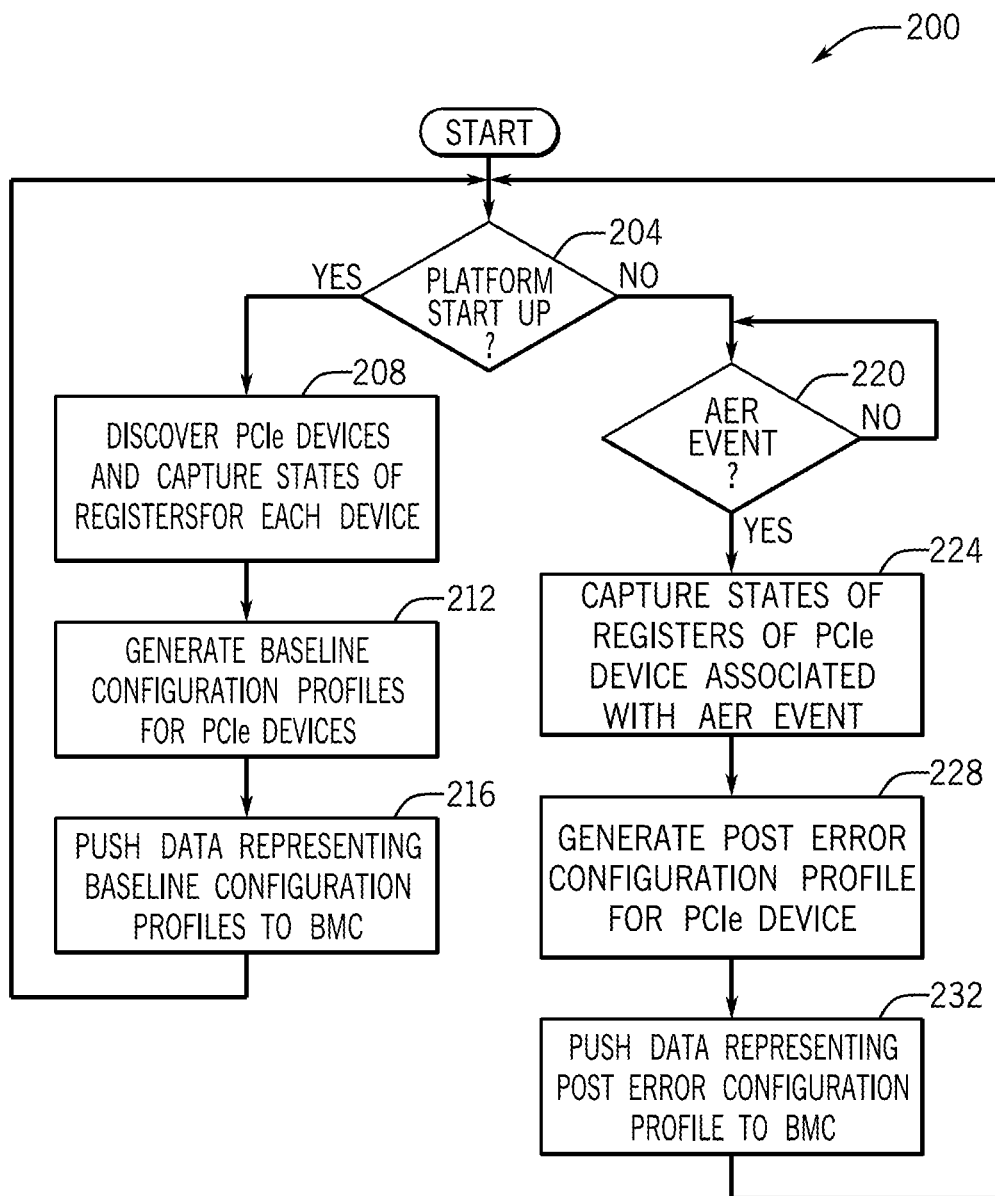
FIG. 2 is a flow diagram depicting a process used by a data collection daemon agent of an operating system of the computer platform of FIG. 1 according to an example implementation.

Referring to FIG. 2 in conjunction with FIG. 1, in accordance with example implementations, the data collection daemon agent 164 may perform a process 200. Pursuant to the process 200, the data collection daemon agent 164 determines (decision block 204) whether the computer platform 100 has been recently started (i.e., powered on or reset), and if so, the agent 164 discovers (block 208) the PCIe devices 110 and captures states of the registers 112. The data collection daemon agent 164 then generates (block 212) corresponding baseline configuration profiles 140 for the PCIe devices 110 and pushes (block 216) data representing the baseline configuration profiles 140 to the BMC 129.

As a more specific example, in accordance with some implementations, the PCIe device 110 may contain Base Address Registers (BARs), which may be accessed by the UEFI 168 as part of bus enumeration for purposes of determining corresponding memory criteria for the physical and virtual functions of the PCIe device 110. In this manner, in accordance with some implementations, a given PCIe device 110 may specify a particular number of BARs and for each BAR, specify whether a memory-mapped I/O space (MMIO) or I/O space is to be set up for the BAR as well as a particular amount of allocation for this space.

In accordance with example implementations, one or multiple of the registers 112 (whose state is captured by the data collection daemon agent 164) may be AER registers, which contain bits representing the memory criteria for the PCIe device 110. In this manner, the AERs may, for example, store bits, which represent the number of BARs for the PCIe device 110, the type of memory allocated for each BAR, and the amount of memory space (MMIO or I/O space) for each BAR. By capturing the state of the AERs at platform start up (i.e., capturing the baseline configuration profile 140) and at a later time, capturing the state of the AERs (i.e., capturing a post error configuration profile 144), the I/O driver fault analyzer 180 may determine, from these captured profiles 140 and 144, whether the configuration for the PCIe device 110 has changed. If so, the I/O driver fault analyzer 180 may, in accordance with example implementations, deem the change to be the result of a fault, or error, of the corresponding I/O driver 172.

Still referring to FIG. 2, after the computer platform 100 has started up, the data collection daemon agent 164 monitors (as depicted at decision block 220) for an AER event, i.e., for an error notification indicating an error associated with a particular PCIe device 110. In response to occurrence of an AER event, the data collection daemon agent 164 may then capture (block 224) states of registers 112 of the PCIe device 110 associated with the AER event and generate (block 228) a post error configuration profile 144 for the PCIe device 110. In accordance with example implementations, the data collection daemon agent 164 may incorporate such data into the post error configuration profile 144 such as the status of an uncorrectable error status register 112 of the PCIe device 110, the status of a correctable error status register 112 of the PCIe device 110, a status of the corresponding I/O stack 170, a version of the corresponding I/O firmware 116 of the PCIe device 110, a version of the corresponding I/O driver 172 and a driver up time. The data collection daemon agent 164 may then push (block 232) data representing the post error configuration profile 144 to the BMC 129.

Figure 3:
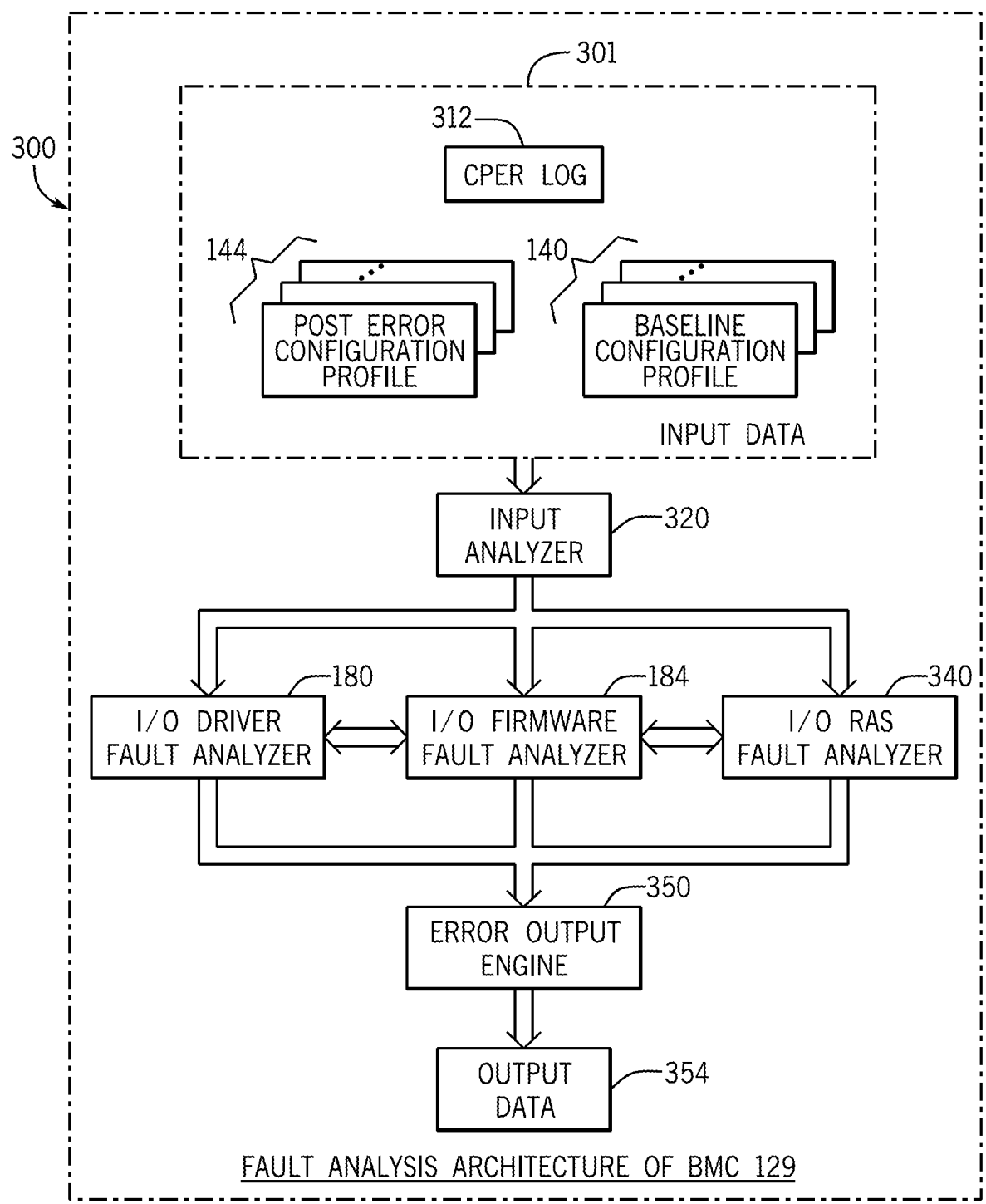
FIG. 3 is an illustration of a fault analysis architecture of the BMC of FIG. 1 according to an example implementation.

FIG. 3 depicts a fault analysis architecture 300 of the BMC 129 in accordance with example implementations. Referring to FIG. 3 in conjunction with FIG. 1, in accordance with example implementations, the architecture 300 includes an input analyzer 320 that receives data 301 for error analysis. As depicted in FIG. 3, in accordance with example implementations, the data 301 includes various forms of input data, such as one or multiple post error configuration profiles 144, a baseline configuration profile 140, a CPER log 312, as well as other possible data. The input analyzer 320 may correlate a particular error 318 with the input data 301 for purposes of identifying the relevant data and forwarding the relevant data to fault analyzers of the architecture 300, such as the I/O driver fault analyzer 180, the I/O firmware fault analyzer 181 and an I/O Reliability, Availability and Service Ability (RAS) fault analyzer 340. As an example, for a particular PCIe device 110, the input analyzer 320 may, based on the input data 301, identify profile data and identification data (e.g., data identifying a particular link, or segment, a bus device number and a function number) for the corresponding PCIe device 110.

In general, in accordance with example implementations, the I/O driver fault analyzer 180 analyzes the data provided by the input analyzer 320 for purposes of determining whether a particular error is attributable to a corresponding I/O driver 172. In accordance with example implementations, the I/O firmware fault analyzer 184 analyzes the data provided by the input analyzer 320 for purposes of determining whether the error is attributable to the I/O firmware 116 of the PCIe device 110. The I/O RAS fault analyzer 340 processes the data provided by the input analyzer 320 for purposes of attributing the error to a particular component of the computer platform 100, such as a CPU core 102, system memory 104, a networking component, and so forth. In accordance with example implementations, as further described herein, the fault analyzers 180, 181 and 340 process the data in a particular order. For example, in accordance with some implementations, the I/O driver fault analyzer 180 first processes the data to assess whether the error 318 is attributable to an I/O driver 172. Next, if the driver is not found to be attributable to an I/O driver 172, then the I/O firmware fault analyzer 181 processes the data to determine whether the error 318 is attributable to firmware on the I/O peripheral. Lastly, in accordance with example implementations, the I/O RAS fault analyzer 340 processes the data for purposes of attributing the error 318 to a component of the computer platform 100, other than an I/O driver 172 or I/O firmware 116.

In accordance with example implementations, the components of the architecture 300 depicted in FIG. 3 may be software components created by the general purpose processing cores 136 of the BMC 129 executing machine-executable instructions 132. In accordance with further example implementations, one or multiple components of the architecture 300 may be a hardware-based component, i.e., a component that is formed wholly or partially by dedicated hardware that does not execute machine-executable instructions. For example, in accordance with some implementations, one or multiple components of the architecture 300 may be formed from an application specific integrated circuit (ASIC), a field programmable gate array (FPGA), a complex programmable logic device (CPLD), and so forth.

In accordance with example implementations, as further described herein, the fault analyzers 180, 184 and 340 process the data provided by the input analyzer 320 in a particular order for purposes of attributing the error to a particular hardware or software component. For example, in accordance with some implementations, the I/O driver fault analyzer 180 first determines whether the error is attributable to an I/O driver 172. Next, if the I/O driver fault analyzer 180 determines that the error is not attributable to the I/O driver 172, then the I/O firmware fault analyzer 184 determines whether the error is attributable to the I/O firmware 116. Lastly, in accordance with example implementations, the I/O RAS fault analyzer 340 processes the data for purposes of possibly attributing the error to a component of the computer platform 100, other than an I/O driver 172 or I/O firmware. As depicted in FIG. 3, in accordance with example implementations, the fault analysis architecture 300 includes an error output engine 350 that correlates data provided by the I/O driver fault analyzer 180, I/O firmware fault analyzer 184 and I/O RAS fault analyzer 340 for purposes of producing output data 354. In general, the output data 354 identifies aspects of a given error, such as the PCIe device 110 associated with the error, a severity of the error, whether the error is attributable to the I/O driver 172 and whether the error is attributable to the I/O firmware 116, whether the error is correctable or uncorrectable, whether the error is fatal, and so forth. In accordance with some implementations, the BMC 129 may communicate this information to the remote management server 190 (via a.

Figure 4:
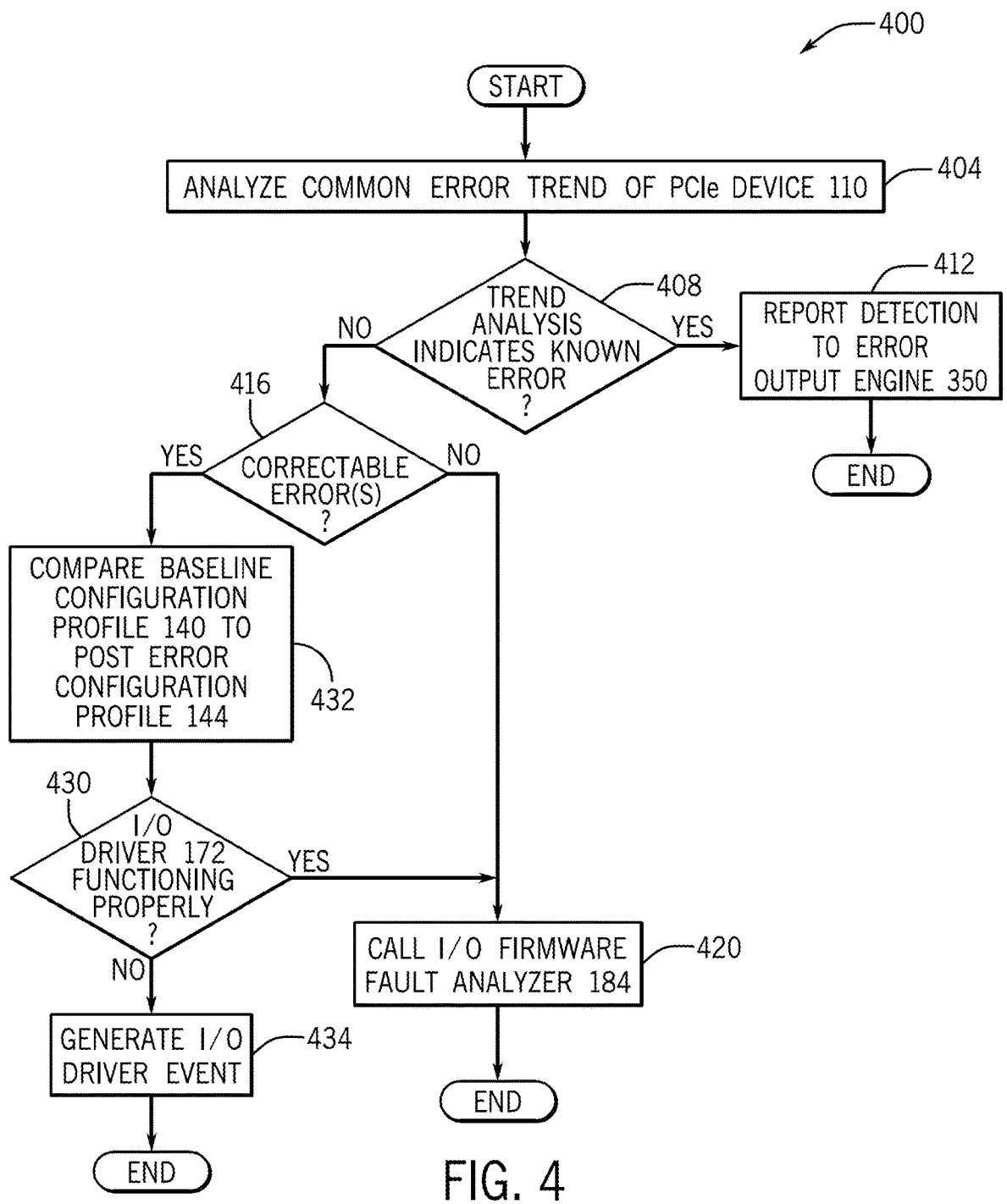
FIG. 4 is a flow diagram of a process performed by the I/O driver fault analyzer of the BMC according to an example implementation.

Referring to FIG. 4 in conjunction with FIGS. 1 and 3, in accordance with example implementations, the I/O driver fault analyzer 180 may perform a process 400, which includes analyzing (block 404) a common error trend of the PCIe device 110, pursuant to block 404. In this manner, a trend analysis may indicate a known reoccurring error. If the I/O driver fault analyzer 180 determines (decision block 408) that the trend analysis indicates a known error, then, the analyzer 180 reports the detection to the error output engine 350, pursuant to block 412. At this point, the analysis by the fault analysis architecture 300 ends.

If, pursuant to decision block 408, the I/O driver fault analyzer 180 determines that the trend analysis does not indicate a known error, then, pursuant to decision block 416, the I/O driver fault analyzer 180 determines whether the corresponding error(s) are correctable. If not, then the analysis by the I/O driver fault analyzer 180 ends and a call is made to the I/O firmware fault analyzer 184, pursuant to block 420. If, however, the error(s) are correctable, then the I/O driver fault analyzer 180 compares the baseline configuration profile 140 to the post error configuration profile 144, pursuant to block 432. If, pursuant to decision block 416, the I/O driver fault analyzer 180 determines that the error(s) are correctable, then the I/O driver fault analyzer 180 performs a comparative analysis, comparing the baseline configuration profile 140 to the post error configuration profile 144, pursuant to block 432.

In accordance with some implementations, the comparative analysis by the I/O driver fault analyzer 180 may be a bitwise comparison between register states of the baseline configuration profile 140 and the post error configuration profile 144. In accordance with further example implementations, the I/O driver fault analyzer 180 extracts a particular configuration from the baseline configuration profile 140, extracts information from the post error configuration profile 144 and determines whether this information has changed. For example, the I/O driver fault analyzer 180 may determine that, when the PCIe device 110 initially is booted, three BARs were configured. However, the I/O driver fault analyzer 180 may determine that, according to the post error configuration profile 144, there are now two BARs configured. For this example scenario, the I/O driver fault analyzer 180 attributes the error to the I/O driver 172.

As another example, from the baseline configuration profile 140, the I/O driver fault analyzer 180 may determine that initially two BARs were configured from a sixty-four bit MMIO space, but the post configuration profile 144 may represent that a thirty-two bit MMIO space is now configured. For this scenario, the I/O driver fault analyzer 180 attributes the error to the I/O driver 172.

As another example, from a baseline configuration profile 140, the I/O driver fault analyzer 180 may determine that two BARs of 128 megabytes (MB) MMIO space was allocated. However, the post error configuration profile 144 may reveal that now, two BARs are configured with 64 MB MMIO space. For this example scenario, the I/O driver fault analyzer 180 attributes the error to the I/O driver 172.

As another example, the I/O driver fault analyzer 180 may attribute an error to the I/O driver 172 for a number of other conditions, such as, for example, the post error configuration profile 144 representing that the PCIe device 110 has an incompatible power state.

Therefore, if pursuant to decision block 430, the I/O driver fault analyzer 180 determines that the I/O driver 172 is not functioning properly, then the I/O driver fault analyzer 180 generates an I/O driver event, pursuant to block 434, i.e., the analyzer 180 marks the I/O driver 172 as being faulty. If, however, pursuant to decision block 430, the I/O driver fault analyzer 180 determines that the I/O driver 172 is functioning properly, then the analyzer 180 calls the I/O firmware fault analyzer 184, pursuant to block 420.

Figure 5:
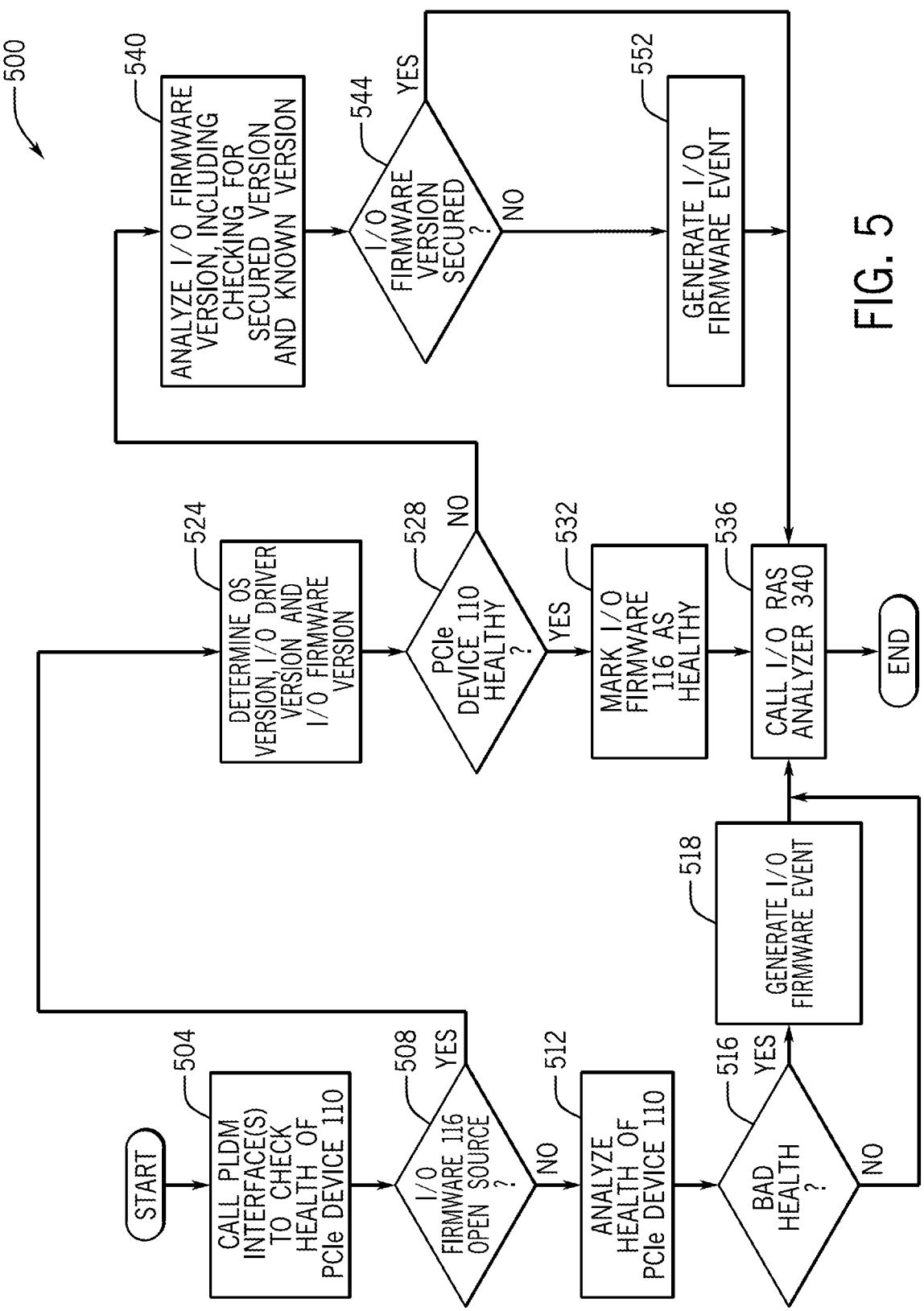
FIG. 5 is a flow diagram depicting a process performed by an I/O firmware fault analyzer of the BMC according to an example implementation.

Referring to FIG. 5 in conjunction with FIGS. 1 and 3, in accordance with example implementations, the I/O firmware fault analyzer 184 may perform a process 500. First, the process 500 includes calling (block 504) platform level data model (PLDM) interfaces of the PCIe device 110 to check the health of the device 110. In accordance with example implementations, the PCIe device 110 may have various health sensors and provide data representing the corresponding health states of the sensors. For example, a particular state may be normal, non-critical, critical, fatal, upper non-critical, upper fatal, lower fatal, and so forth. The I/O firmware fault analyzer 184 determines (decision block 508) whether the I/O firmware 116 is open source firmware. If not, the I/O firmware fault analyzer 184 analyzes the health of the PCIe device 110 using the states provided through the PLDM interfaces, pursuant to block 512. If the I/O firmware fault analyzer 184 determines, as part of this health analysis, that the PCIe device 110 is in bad health, pursuant to decision block 516, then, the I/O fault analyzer 184 generates (block 518) an I/O firmware event, which marks the I/O firmware 116 as being attributable for the error. Next, the I/O firmware fault analyzer 184 calls (block 536) the I/O RAS analyzer 340.

If, pursuant to decision block 508, the I/O firmware fault analyzer 184 determines that the I/O firmware 116 is open source firmware, then the I/O firmware fault analyzer 184 determines (block 524) the operating system version, I/O driver version and I/O firmware version. If, based on the health states provided by the PLDM interfaces, the I/O firmware fault analyzer 184 determines that the PCIe device 110 is healthy, then the analyzer 184 marks (block 532) the I/O firmware 116 as healthy and calls the I/O RAS analyzer 340, pursuant to block 536. If, however, the I/O firmware fault analyzer 184 determines, pursuant to decision block 528, that the PCIe device 110 is unhealthy, then the analyzer 180 performs a further analysis of the I/O firmware. In particular, in accordance with some implementations, the I/O firmware fault analyzer 184 analyzes (block 540) the I/O firmware version, including checking whether the I/O firmware version is a known and secured version.

In accordance with some implementations, a "secured version" of the I/O firmware 116 refers to the I/O firmware image being signed by a private cryptographic key of an asymmetric key pair. In this manner, the I/O firmware fault analyzer 184 may, through the public key of the asymmetric key pair, verify the signature of the I/O firmware image for purposes of determining whether the I/O firmware 116 is secured. If, pursuant to decision block 544, the I/O firmware fault analyzer 184 determines that the I/O firmware version is not secured, then the I/O firmware fault analyzer 184 generates an I/O firmware event, pursuant to block 552, to represent that the error has been attributed to the I/O firmware 116. The I/O firmware fault analyzer 184 then, in accordance with example implementations, calls the I/O RAS analyzer 340, pursuant to block 536.

Figure 6:
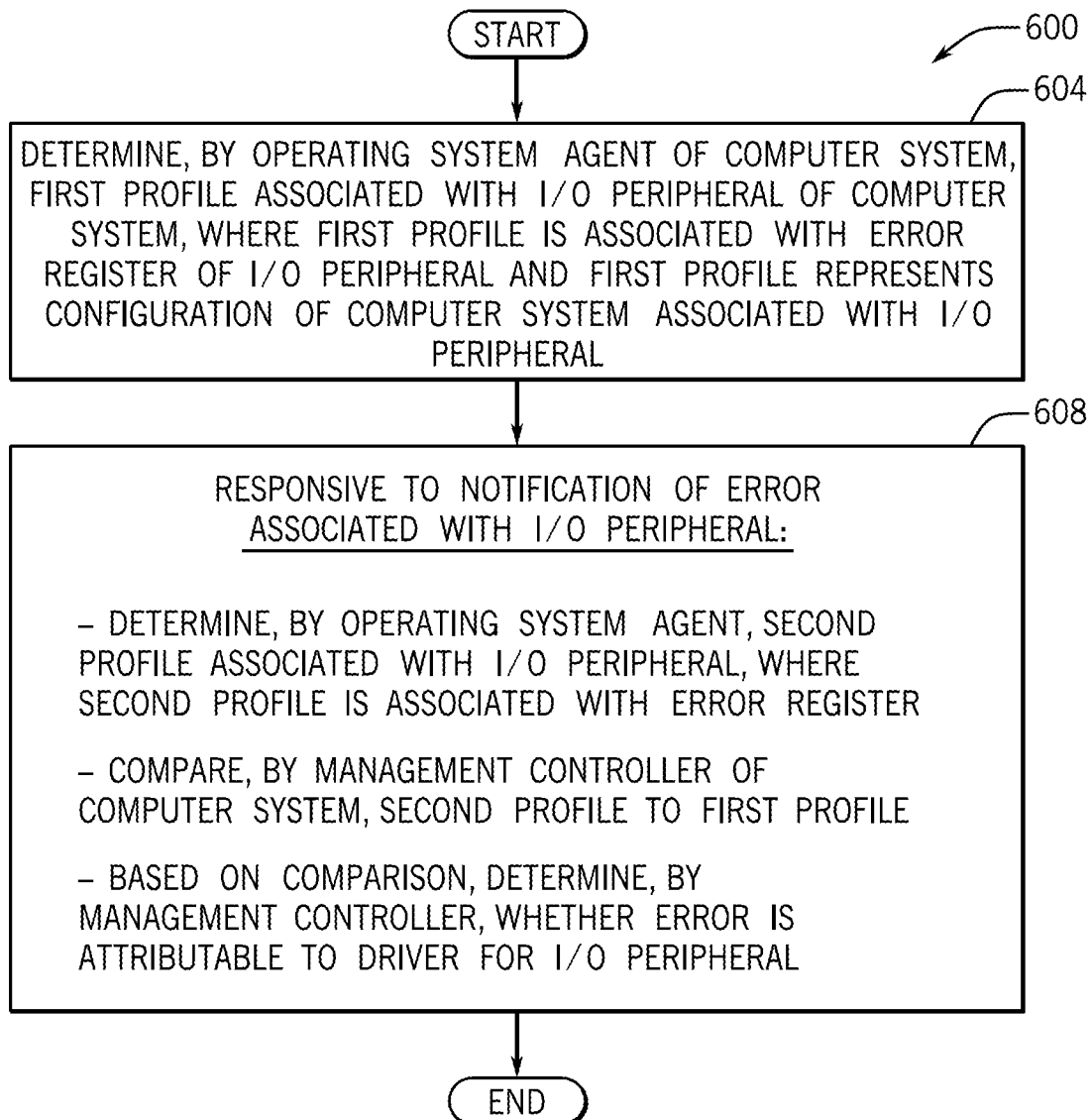
FIG. 6 is a flow diagram depicting a process to determine whether an error associated with an I/O peripheral is attributable to a driver for the I/O peripheral according to an example implementation.

Referring to FIG. 6, in accordance with example implementations, a process 600 includes determining (block 604), by an operating system agent of a computer system, a first profile that is associated with an input/output (I/O) peripheral of the computer system. The first profile is associated with an error register of the I/O peripheral, and the first profile represents a configuration of the computer system that is associated with the I/O peripheral. The process 600 includes, pursuant to block 608, responsive to a notification of an error being associated with the I/O peripheral, determining, by the operating system agent, a second profile that is associated with the I/O peripheral. The second profile is associated with the error register. Moreover, responsive to the notification of the error, the process 600 includes comparing, by a baseboard management controller of the computer system, the second profile to the first profile. Based on the comparison, the process 600 includes determining, by the baseboard management controller, whether the error is attributable to a driver for the I/O peripheral.

Figure 7:
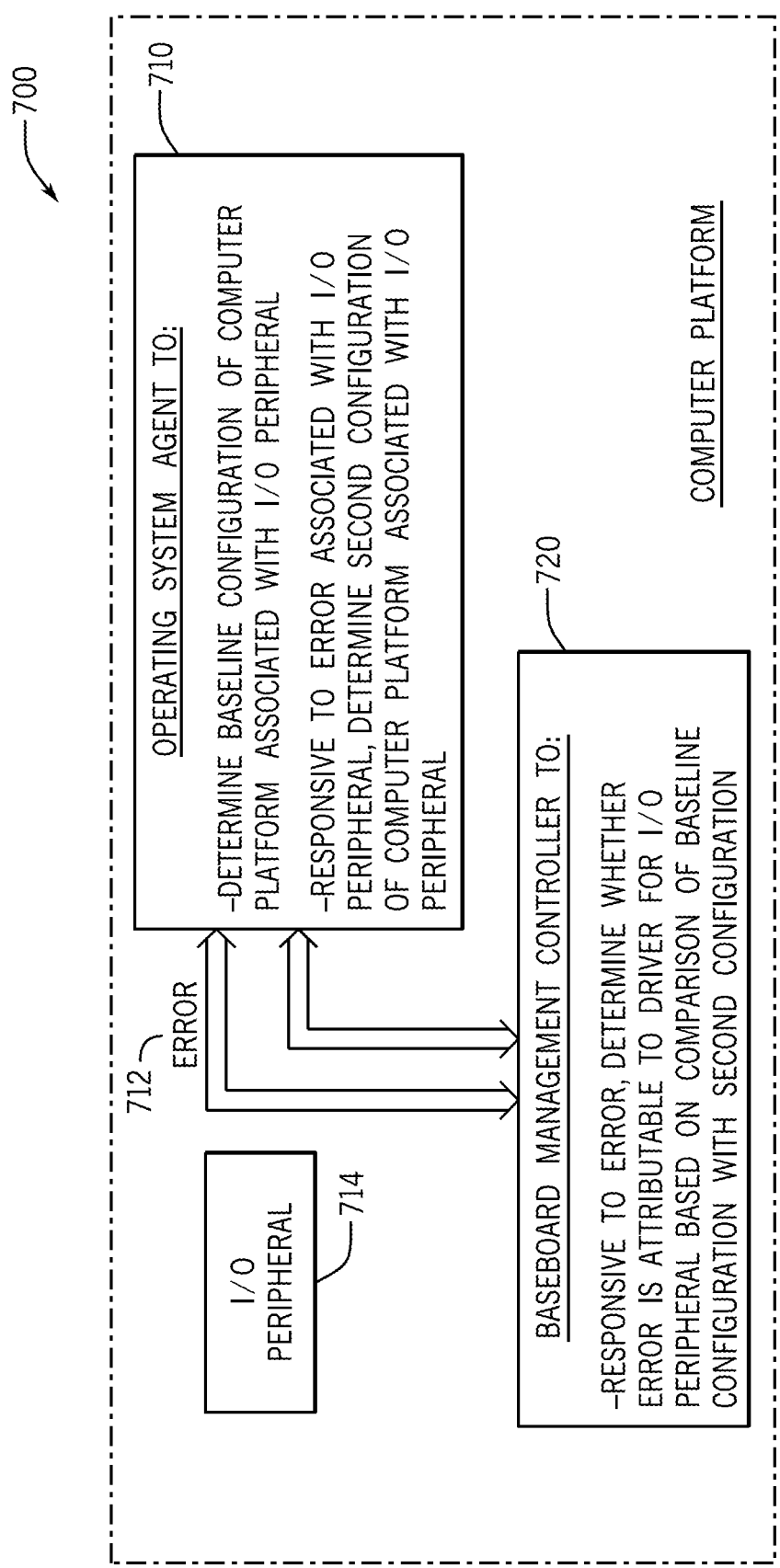
FIG. 7 is a schematic diagram of a computer platform that includes a baseboard management controller to determine whether an error associated with an I/O peripheral is attributable to a driver for the peripheral according to an example implementation.

Referring to FIG. 7, in accordance with an example implementation, a computer system 700 includes an input/output (I/O) peripheral 714; an operating system agent 710; and a baseboard management controller 720. The operating system agent 710 to determine a baseline configuration of the computer system 700 associated with the I/O peripheral 714; and responsive to an error 712 associated with the I/O peripheral 714, determine a second configuration of the computer system 700 associated with the I/O peripheral 714. The baseboard management controller 720 to, responsive to the error 712, determine whether the error 712 is attributable to a driver for the I/O peripheral 714 based on a comparison of the baseline configuration with the second configuration.

Figure 8:
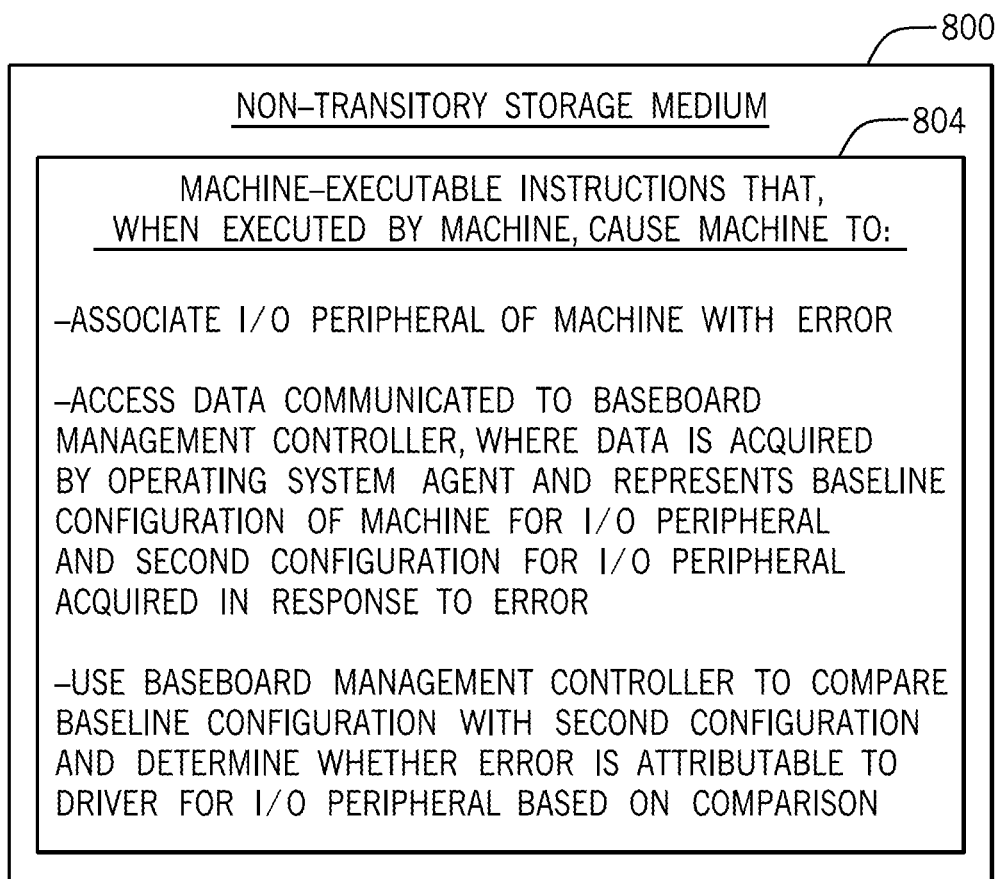
FIG. 8 is an illustration of machine-executable instructions that, when executed by a machine, cause the machine to determine whether an error associated with an I/O peripheral is attributable to a driver for the I/O peripheral according to an example implementation.

Referring to FIG. 8, in accordance with an example implementation, a non-transitory storage medium 800 stores machine-executable instructions 804 that, when executed by a machine, cause the machine to associate an I/O peripheral of the machine with an error. The instructions 804, when executed by the machine, further cause the machine to access data communicated to a baseboard management controller. The data is acquired by an operating system agent and represents a baseline configuration of the machine for the I/O peripheral and a second configuration of the machine for the I/O peripheral acquired in response to the error. The instructions 804, when executed by the machine, further cause the machine to use the baseboard management controller to compare the baseline configuration with the second configuration and determine whether the error is attributable to a driver for the I/O peripheral based on the comparison.

In accordance with example implementations, determining the first profile includes reading, by the operating system agent, the error register to determine a first power state of the I/O peripheral; and determining the second profile includes reading, by the operating system agent, the error register to determine a second power state of the I/O peripheral. Comparing the second profile to the first profile includes comparing, by the baseboard management controller, the second power to the first power state. A particular advantage is that the source of the error may be specifically attributed to the driver.

In accordance with example implementations, determining the first profile includes reading, by the operating system agent, the error register to determine a first number of base address registers of the I/O peripheral which are configured. Determining the second profile includes reading, by the operating system agent, the error register to determine a second number of the base address registers of the I/O peripheral which are configured. Comparing the second profile to the first profile includes comparing, by the baseboard management controller, the second number to the first number. A particular advantage is that the source of the error may be specifically attributed to the driver.

In accordance with example implementations, determining the first profile includes reading, by the operating system agent, the error register to determine a first memory criteria that is associated with a base address register of the I/O peripheral. Determining the second profile includes reading, by the operating system agent, the error register to determine a second memory criteria that is associated with the base address register. Comparing the second profile to the first profile includes comparing, by the baseboard management controller, the second memory criteria to the first memory criteria. A particular advantage is that the source of the error may be specifically attributed to the driver.

In accordance with example implementations, the first memory criteria represents at least one of an allocation of a memory space or an I/O space of the computer system. A particular advantage is that the source of the error may be specifically attributed to the driver.

In accordance with example implementations, determining the first profile further includes determining, by the operating system agent, at least one of a status of an uncorrectable error register of the I/O peripheral, a status of a correctable error register of the I/O peripheral, or a status of an advanced error reporting register of the I/O peripheral. A particular advantage is that the source of the error may be specifically attributed to the driver.

In accordance with example implementations, determining the first profile further includes determining, by the operating system agent, at least one of a status of an I/O stack and a driver status. A particular advantage is that the source of the error may be specifically attributed to the driver.

In accordance with an example implementation, determining the first profile further includes providing data describing a context of the first profile. The data represents at least one of a version of firmware used by the computer system, a version of the driver, or a time between loading and unloading of the driver. A particular advantage is that the source of the error may be specifically attributed to the driver.

In accordance with an example implementation, the baseboard management controller determines whether the error is associated with a trend of errors; and in response to determining that the error is associated with the trend of errors, auditing logged events that are associated with the error. A determination is made whether the error is attributable to the driver responsive to the audit of the logged events. A particular advantage is that the source of the error may be specifically attributed to the driver.

In accordance with an example implementation, determining whether the error is attributable to the driver includes determining, by the baseboard management controller, that the error is not attributable to the driver. The baseboard management controller determines whether the error is attributable to firmware of the I/O peripheral. A particular advantage is that the error may be directly attributable to firmware of the I/O peripheral.

In accordance with an example implementation, determining the error is attributable to the firmware includes determining, by the baseboard management controller, a version associated with the firmware and determining, by the baseboard management controller, whether the error is attributable to the firmware based on the version. A particular advantage is that the error may be directly attributable to firmware of the I/O peripheral.

In accordance with an example implementation, determining the error is attributable to the firmware includes determining, by the baseboard management controller, whether the firmware is open source firmware; and responsive to determining that the firmware is open source firmware, determining, by the baseboard management controller, whether a version of the open source firmware is secured. The baseboard management controller determines whether the error is attributable to the firmware based on whether the version of the open source firmware is secured. A particular advantage is that the error may be directly attributable to firmware of the I/O peripheral.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
 determining, by an operating system agent of a computer system, a first profile associated with an input/output (I/O) peripheral of the computer system, wherein the first profile is associated with an error register of the I/O peripheral, and the first profile represents a configuration of the computer system associated with the I/O peripheral; and
 responsive to a notification of an error being associated with the I/O peripheral:
  determining, by the operating system agent, a second profile associated with the I/O peripheral, wherein the second profile is associated with the error register;
  comparing, by a baseboard management controller of the computer system, the second profile to the first profile;
  based on the comparison, determining, by the baseboard management controller, whether the error is attributable to a driver for the I/O peripheral;

determining, by the baseboard management controller, whether the error is associated with a trend of errors;

in response to determining that the error is associated with the trend of errors, auditing logged events associated with the error; and determining whether the error is attributable to the driver based on the auditing of the logged events.

2. The method of claim 1, wherein:
determining the first profile comprises reading, by the operating system agent, the error register to determine a first power state of the I/O peripheral;
determining the second profile comprises reading, by the operating system agent, the error register to determine a second power state of the I/O peripheral; and
comparing the second profile to the first profile comprises comparing, by the baseboard management controller, the second power state to the first power state.

3. The method of claim 1, wherein:
determining the first profile comprises reading, by the operating system agent, the error register to determine a first number of base address registers of the I/O peripheral which are configured;
determining the second profile comprises reading, by the operating system agent, the error register to determine a second number of base address registers of the I/O peripheral which are configured; and
comparing the second profile to the first profile comprises comparing, by the baseboard management controller, the second number to the first number.

4. The method of claim 1, wherein:
determining the first profile comprises reading, by the operating system agent, the error register to determine a first memory criteria associated with a base address register of the I/O peripheral;
determining the second profile comprises reading, by the operating system agent, the error register to a second memory criteria associated with the base address register; and
comparing the second profile to the first profile comprises comparing, by the baseboard management controller, the second memory criteria to the first memory criteria.

5. The method of claim 4, wherein the first memory criteria represent at least one of an allocation of a memory space or an I/O space of the computer system.

6. The method of claim 1, wherein determining the first profile further comprises determining, by the operating system agent, at least one of a status of an uncorrectable register error of the I/O peripheral, a status of a correctable register error of the I/O peripheral, or a status of an advanced error reporting register of the I/O peripheral.

7. The method of claim 1, wherein determining the first profile further comprises determining, by the operating system agent, at least one of a status of an I/O stack and a driver status.

8. The method of claim 1, wherein determining the first profile further comprises providing data describing a context of the first profile, wherein the data represents at least one of a version of firmware used by the computer system, a version of the driver, or a time between loading and unloading of the driver.

9. The method of claim 1, wherein determining whether the error is attributable to the driver comprises determining, by the baseboard management controller, that the error is not attributable to the driver, the method further comprising:
determining, by the baseboard management controller, whether the error is attributable to firmware of the I/O peripheral.

10. The method of claim 9, wherein determining the error is attributable to the firmware comprises:
determining, by the baseboard management controller, a version associated with the firmware; and
determining, by the baseboard management controller, whether the error is attributable to the firmware based on the version.

11. The method of claim 9, wherein determining the error is attributable to the firmware comprises:
determining, by the baseboard management controller, whether the firmware is open source firmware;
responsive to determining that the firmware is open source firmware, determining, by the baseboard management controller, whether a version of the open source firmware is secured; and
determining, by the baseboard management controller, whether the error is attributable to the firmware based on whether the version of the open source firmware is secured.

12. A computer system comprising:
an input/output (I/O) peripheral;
an operating system agent to:
determine a baseline configuration of the computer system associated with the I/O peripheral; and
responsive to an error associated with the I/O peripheral, determine a second configuration of the computer system associated with the I/O peripheral;
a baseboard management controller to:
responsive to the error, determine whether the error is attributable to a driver for the I/O peripheral based on a comparison of the baseline configuration with the second configuration;
determine whether the error is associated with a trend of errors;
in response to the determination that the error is associated with the trend of errors, audit logged events associated with the error; and
determine whether the error is attributable to the driver based on the auditing of the logged events.

13. The computer system of claim 12, wherein:
the I/O peripheral comprises an error register;
the operating system agent is to further read the error register and determine the baseline configuration in response to a power on or reset of the computer system, and read the error register to determine the second configuration responsive to the error.

14. The computer system of claim 12, wherein the baseboard management controller is to further compare the baseline configuration with the second configuration to determine whether a resource allocation for the I/O peripheral represented in the baseline configuration has changed.

15. The computer system of claim 12, wherein the baseboard management controller is to further determine whether the error is attributable to firmware of the I/O peripheral based on a version of the firmware.

16. A non-transitory storage medium to store machine-executable instructions that, when executed by a machine, cause the machine to:
associate an input/output (I/O) peripheral of the machine with an error;
access data communicated to a baseboard management controller, wherein the data is acquired by an operating system agent and represents a baseline configuration of the machine for the I/O peripheral and a second configuration of the machine for the I/O peripheral acquired in response to the error;

use the baseboard management controller to compare the baseline configuration with the second configuration and determine whether the error is attributable to a driver for the I/O peripheral based on the comparison;

use the baseboard management controller to determine whether the error is associated with a trend of errors;

in response to the determination that the error is associated with the trend of errors, audit logged events associated with the error; and determine whether the error is attributable to the driver based on the auditing of the logged events.

17. The storage medium of claim 16, wherein:

the instructions, when executed by the machine, further cause the machine to:

determine, based on the baseline configuration, a first number of base address registers configured for the I/O peripheral;

determine, based on the second configuration, a second number of base address registers configured for the I/O peripheral; and attribute the error to the driver responsive to the second number being different from the first number.

18. The storage medium of claim 16, wherein the instructions, when executed by the machine, further cause the machine to:

determine a first memory mapped input/output (MMIO) space configuration from the baseline configuration;

determine a second MMIO space configuration from the second configuration; and determine whether the error is attributable to the driver based on whether the second MMIO configuration differs from the first MMIO configuration.

19. The storage medium of claim 16, wherein the instructions, when executed by the machine, further cause the machine to determine whether the error is attributable to firmware of the I/O peripheral based on a version of the firmware.

* * * * *